(12) United States Patent
Korzeniowski

(10) Patent No.: US 8,951,412 B2
(45) Date of Patent: Feb. 10, 2015

(54) WASTEWATER LAGOON AERATION TREATMENT SYSTEM

(76) Inventor: Jan A. Korzeniowski, Calgary (CA)

( * ) Notice: Subject to any disclaimer, the term of this patent is extended or adjusted under 35 U.S.C. 154(b) by 250 days.

(21) Appl. No.: 12/465,538

(22) Filed: May 13, 2009

(65) Prior Publication Data
US 2010/0051522 A1 Mar. 4, 2010

(51) Int. Cl.
C02F 3/00 (2006.01)
C02F 3/12 (2006.01)
C02F 1/00 (2006.01)

(52) U.S. Cl.
CPC ............... *C02F 3/1257* (2013.01); *C02F 1/008* (2013.01); *C02F 2209/08* (2013.01); *C02F 2209/10* (2013.01); *C02F 2209/16* (2013.01); *C02F 2209/18* (2013.01); *C02F 2303/10* (2013.01)
USPC ........ 210/150; 210/151; 210/220; 210/195.1; 210/196; 210/197

(58) Field of Classification Search
USPC .............. 210/621–628, 150–151, 220, 195.1, 210/196–197
See application file for complete search history.

(56) References Cited

U.S. PATENT DOCUMENTS

| | | | | |
|---|---|---|---|---|
| 3,730,881 A * | 5/1973 | Armstrong | ..... | 210/615 |
| 4,997,557 A * | 3/1991 | Andersen | ..... | 210/142 |
| 5,288,405 A * | 2/1994 | Lamb, III | ..... | 210/605 |
| 5,441,634 A * | 8/1995 | Edwards | ..... | 210/194 |
| 6,530,895 B1 * | 3/2003 | Keirn | ..... | 604/24 |
| 6,569,335 B1 * | 5/2003 | Johnson | ..... | 210/614 |
| 6,969,052 B2 * | 11/2005 | Korzeniowski | ..... | 261/76 |
| 7,172,177 B2 * | 2/2007 | Durda | ..... | 261/28 |
| 2001/0045390 A1 * | 11/2001 | Kim et al. | ..... | 210/605 |
| 2003/0164329 A1 * | 9/2003 | Young | ..... | 210/605 |
| 2008/0264856 A1 * | 10/2008 | Maga et al. | ..... | 210/609 |

* cited by examiner

*Primary Examiner* — Chester Barry

(57) ABSTRACT

A novel lagoon aeration treatment system is provided which can be used with existing or new wastewater lagoons to increase the lagoon's treatment efficiency and capacity, and to allow for a continuous, year round discharge of treated wastewater to the environment. The system can be operated in warm and cold climates for treatment of municipal and industrial wastewaters of varying strength and flow rates in a secondary activated sludge treatment process, a tertiary activated sludge treatment process, or an extended aeration treatment process. The system employs an outside aeration system consisting of a wastewater pump and an air aspirator-mixer to provide wastewater aeration outside the lagoon and a pipe system placed inside the lagoon to provide a recirculation of aerated and non-aerated wastewater and sludge between the lagoon and the outside aeration system for re-aeration and return to the lagoon in a continuous or interment manner to accomplish a desired treatment level and efficiency and operating costs.

22 Claims, 5 Drawing Sheets

WASTEWATER LAGOON AERATION TREATMENT SYSTEM

FIELD OF THE INVENTION

The invention relates to an aeration treatment system of municipal and industrial wastewaters in lagoons (stabilization ponds) to accomplish the wastewater treatment to secondary or tertiary treatment standards.

BACKGROUND OF THE INVENTION

Wastewater lagoons or stabilization ponds provide the simplest and the oldest wastewater treatment for municipal and industrial wastewaters which support bacteriological activity and decomposition, and reduction of organic matter.

Wastewater lagoons are primarily used for wastewater treatment by small municipalities and industries, where adequate land is available.

Wastewater lagoons are typically known as conventional lagoons and aerated lagoons.

In the conventional lagoons, aeration of the wastewater is not used and in the aerated lagoons the wastewater is aerated inside the lagoons, for a period of several days to several weeks, depending on the climatic conditions and strength of the wastewater. Air is introduced into the wastewater by air blowers through pipes and air diffusers which are located at the bottom of the lagoons, in a grid pattern, in order to cover the lagoons evenly and adequately. The air diffusers produce air bubbles which vary in size from fine to coarse and which rise from the bottom to the top of the wastewater under static conditions.

The purpose of the aeration is to introduce oxygen into the wastewater which contain aerobic bacteria and which need oxygen for living, reproduction and degradation of organic matter contained in the wastewater.

Another method of the wastewater aeration is by surface mechanical mixers located on the surface of the wastewater or by submerged mechanical mixers c/w air aspirators located in the lower part of the wastewater. Both types of the air-wastewater mixers introduce air into the wastewater under dynamic conditions and produce air bubbles of varying size, quantity and range of dispersion, and efficiency of transfer of oxygen into the wastewater.

Both conventional and aerated lagoons have several essential drawbacks.

The conventional lagoons require a large area, impermeable soil or synthetic plastic or asphalt or concrete liners and are costly to construct. Lagoons which are not watertight may cause serious environmental problems of contamination of soil and ground and surface waters, and become a health hazard. The conventional aerated lagoons are not efficient, require a large area as compared to mechanical/biological wastewater treatment plants, have a high electric power demand and are not suitable for installation in cold climates. Also the equipment located inside the lagoons is difficult and costly to maintain.

The invention is based on aeration of wastewater outside lagoons by means of a wastewater pump and an efficient air aspirator-mixer which renders an economical aeration system and which facilitates maintenance of the aeration equipment, and which lends itself to a flexible design of the aeration treatment system to operate as an activated sludge process in a secondary treatment system, in a tertiary treatment system, or in an extended aeration treatment system.

The invention provides an efficient and economical wastewater treatment system which can operate in warm and cold climates, and which can be used with existing or new lagoons having a single or multi-cell design including anaerobic, primary and secondary cells.

The invention is well suited to treatment of municipal and industrial wastewaters with varying strength and flow rates.

New wastewater treatment facility can be provided with a small lagoon having retention time of several days to several weeks in order to store settled solids and to provide daily flow balancing of incoming wastewater, and to provide adequate clarification of treated wastewater for a continuous discharge of the treated wastewater to the environment throughout the year, without a seasonal storage.

The wastewater aeration treatment system, according to the invention, requires a small building to house the aeration equipment and small tanks which are optional for installations in cold climates.

BRIEF SUMMARY OF THE INVENTION

The aeration treatment system of the present invention is a system for treatment of municipal and industrial wastewaters in lagoons or stabilization ponds.

The aeration treatment system can operate as an activated sludge process in a secondary or a tertiary wastewater treatment system and it comprises a lagoon and an aeration system located outside the lagoon as shown on FIGS. 1, 1A, 2 & 2A.

The lagoon consists of at least one primary settling and one clarification (secondary settling) cell or a primary settling, a clarification (secondary settling) and an activated sludge return cell; although, an additional storage cell of treated wastewater can be provided in existing and new lagoons, as it may be required by local environmental regulations for discharge of treated wastewater to the environment.

The aeration treatment system can operate as an activated sludge process in an extended aeration treatment system, which comprises a lagoon and an aeration system located outside the lagoon as shown on FIGS. 3 & 3A.

The lagoon consists of a single cell, although a multiple cell lagoon can be used as well.

The aeration system as shown in FIGS. 1, 1A, 2, 2A, 3 & 3A comprises primarily an aeration pump, an air aspirator-mixer, and associated piping and control system. Alternatively, an aeration tank and an activated sludge return tank, and an anoxic tank can be used as options depending on the level of treatment required, and site conditions.

The primary settling cell as shown in FIGS. 1, 1A, 2 & 2A allows for settling and decomposition of primary suspended solids (primary sludge) and for equalization of the raw wastewater flow rates throughout a day or several days.

The primary settling cell retention capacity can range from several days to several weeks of an average day wastewater flow volume. The settled primary solids (primary sludge) undergo an anaerobic decomposition in the primary settling cell.

The clarification (secondary settling) cell as shown in FIGS. 1, 1A, 2 & 2A allows for settling and decomposition of the remaining secondary suspended solids (secondary sludge) which are predominantly the bio-mass developed in the biological treatment processes which take place in the treatment system. The decomposition of the secondary solids (secondary sludge) in the clarification (secondary settling) cell is primarily anaerobic.

The clarification cell retention capacity can be from several days to several weeks of an average day flow volume of the wastewater.

The sludge return cell as shown in FIGS. 1 & 1A allows for settling of a portion of the secondary suspended solids (activated sludge) and for return of the activated sludge and the aerated wastewater to the aeration system which is located outside the lagoon.

The sludge return cell may be partitioned from the clarification cell with a low height partition wall made of concrete, wood, plastic, earth or other material.

The sludge return cell holding capacity can be from one to several hours, of the average daily raw wastewater flow rate, although, one to two hours may be adequate to retain a portion of the settled secondary solids (activated sludge) for recirculation to the aeration system, at a flow rate of between ten to hundred percent or larger of the incoming raw wastewater flow rate.

The aeration pump can be a single pump or a multiple pump system, although a minimum of two pumps are preferred, one duty and one stand-by, for a reliable system.

The pump is usually a centrifugal wastewater effluent, high efficiency pump with a capacity of several times the average daily flow rate for a peak day wastewater flow volume, for an adequate activated sludge and aerated wastewater recirculation to the aeration system.

The air aspirator-mixer is preferably the J.K. patented air aspirator-mixer, although other air aspirator-mixers can be used. The air aspirator-mixer aspires and mixes air and the wastewater to introduce a sufficient oxygen level into the wastewater for an aerobic biological wastewater treatment process.

The aeration tank as shown in FIGS. 1, 1A, 3 & 3A is provided for an additional aeration of the wastewater, in addition to the aeration of the wastewater provided in the air aspirator-mixer, for a period of one to several hours for an adequate aeration of the wastewater; although, the aeration tank can be eliminated in some systems, depending on the treatment system efficiency and the level of treatment required. The aeration tank is preferred in cold climates.

The aeration tank as shown in FIGS. 2 & 2A can also be supplemented with a clarification/settling tank (activated sludge return tank) for a partial settling of the secondary suspended solids (activated sludge) for recirculation of the activated sludge to the aeration pump and the aeration tank. The activated sludge return tank is an option to the activated sludge return cell described above and as shown in FIGS. 1 & 1A.

The activated sludge return tank retention capacity may be adequate in the range of one to two hours of the aeration system flow rate.

The anoxic tank as shown in FIGS. 1 & 2 is provided for a tertiary wastewater treatment and it preferably consists of two compartments; raw wastewater and activated sludge mixing compartment (upstream compartment) and return aerated wastewater and the raw wastewater and activated sludge mixture mixing compartment (downstream compartment).

The flow rates and the retention capacities of the system components may vary depending on the wastewater quality, the treatment level required and local climatic conditions.

The aeration system may include a recirculation of a portion of the aerated wastewater and activated sludge to the anoxic tanks, to promote phosphorus removal and denitrification as shown in FIGS. 1 & 2.

The wastewater flow throughout the treatment system is by gravity, except the wastewater pumping through the air aspirator-mixers.

BRIEF DESCRIPTION OF THE SEVERAL VIEWS OF THE DRAWING

Embodiments of the invention will now be described, by way of example only, with reference to the accompanying drawings, wherein.

DETAILED DESCRIPTION OF THE INVENTION

Figure 1:
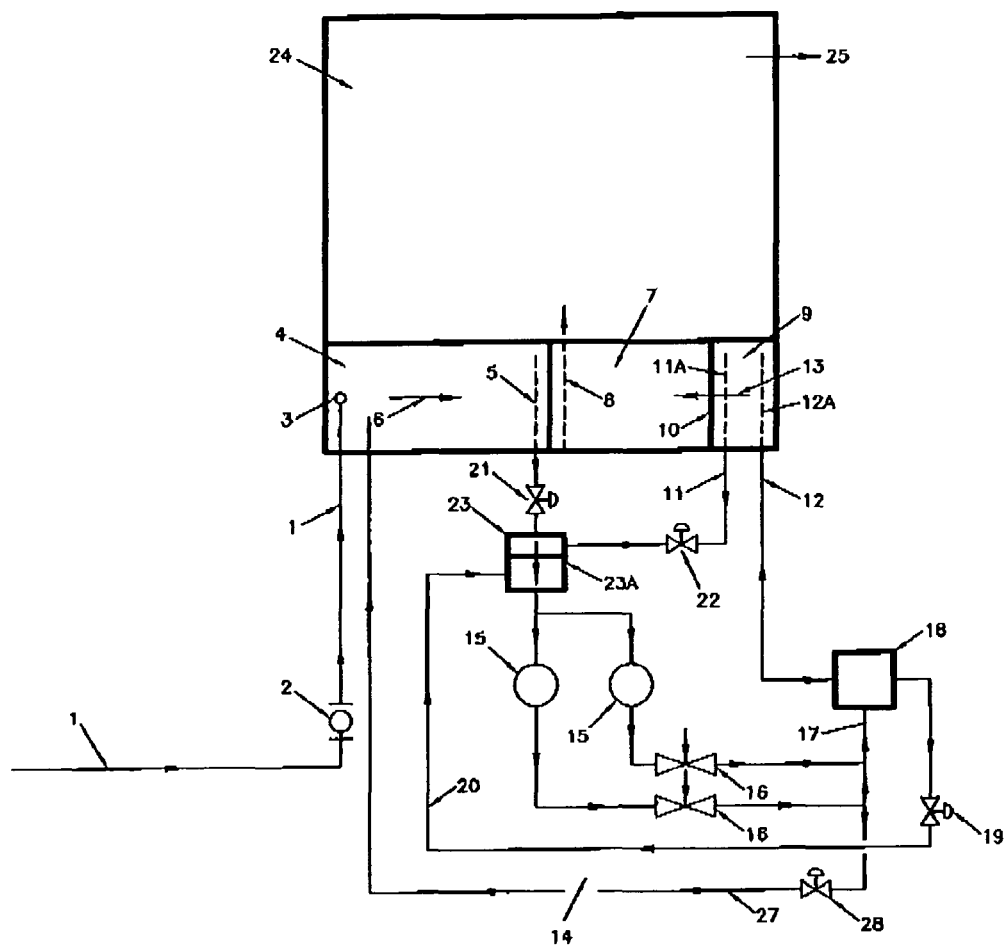
FIG. 1 is a schematic of a plan of a lagoon and an aeration system according to the first embodiment of the present invention showing a lagoon with a primary settling cell, a clarification cell, a sludge return cell and a storage cell which is optional, and an aeration system with two aeration pumps and two air aspirator-mixers, and an aeration tank, and an anoxic tanks which preferably comprises two compartments; upstream and downstream compartment. This treatment system is provided for a tertiary treatment system.

A first embodiment of the invention is shown on FIG. 1. The aeration treatment system primarily comprises a raw wastewater inlet pipe, generally indicated by the reference numeral 1, a primary settling cell 4, a clarification (secondary settling) cell 7, a sludge return cell 9, an anoxic tank 23, and an aeration system 14 which comprises aeration pumps 15, air aspirator-mixers 16 and an aeration tank 18. The aeration treatment system may also include a new or an existing treated wastewater storage cell 24.

The raw wastewater inlet pipe 1 may be provided with a flow meter 2, and a single or multiple inlet 3 into the primary settling cell 4.

On the opposite side of the inlet 3, an outlet pipe 5 is located in the primary settling cell 4, preferably throughout the entire adjacent side of the cell 4 and with adequate perforation or multiple inlet nozzles to promote a plug flow, indicated by an arrow 6, through the cell 4.

The settled raw wastewater flows from the primary settling cell 4 to the aeration system 14, through the outlet pipe 5, a control valve 21, to the anoxic tank 23, the aeration pumps 15, the air aspirator-mixers 16, the aeration tank 18 and into the sludge return cell 9.

A portion of the aerated wastewater is returned from the aeration tank 18 to the anoxic tank 23 through a return pipe 20 and a control valve 19.

The balance of the aerated wastewater is discharged into the sludge return cell 9, through an inlet pipe 12 and 12A, and it undergoes a partial clarification by settling some suspended solids (activated sludge) in the cell 9. The suspended solids (activated sludge) settled in the cell 9 are returned into the aeration system 14, through an outlet pipe 11 and 11A and a control valve 22, and the anoxic tank 23, to the aeration pumps 15, the air aspirator-mixers 16 and the aeration tank 18, where the returned activated sludge is mixed and aerated with the settled raw wastewater which flows from the primary settling cell 4. The aerated mixture of the returned activated sludge and the settled raw wastewater is partially discharged back into the sludge return cell 9 and the anoxic tank 23.

The partially settled, aerated and treated wastewater flows from the sludge return cell 9 into the clarification cell 7 where it undergoes a final clarification before it is discharged into the storage cell 24 or directly to an environment, through an outlet pipe 8, which is preferably perforated or has multiple inlet nozzles along the entire adjacent wall of the clarification cell 7 to promote a "plug" like flow, indicated by an arrow 13, through the cell 9 and the cell 7.

The wastewater treatment as described above is provided primarily by the aeration system 14, and the anoxic tank 23, and additionally in cells 4, 7 and 9 and it functions as a tertiary, activated sludge process for removal of suspended solids (SS) and biochemical oxygen demand (BOD) and nutrients; phosphorus and nitrogen.

Figure 1A:
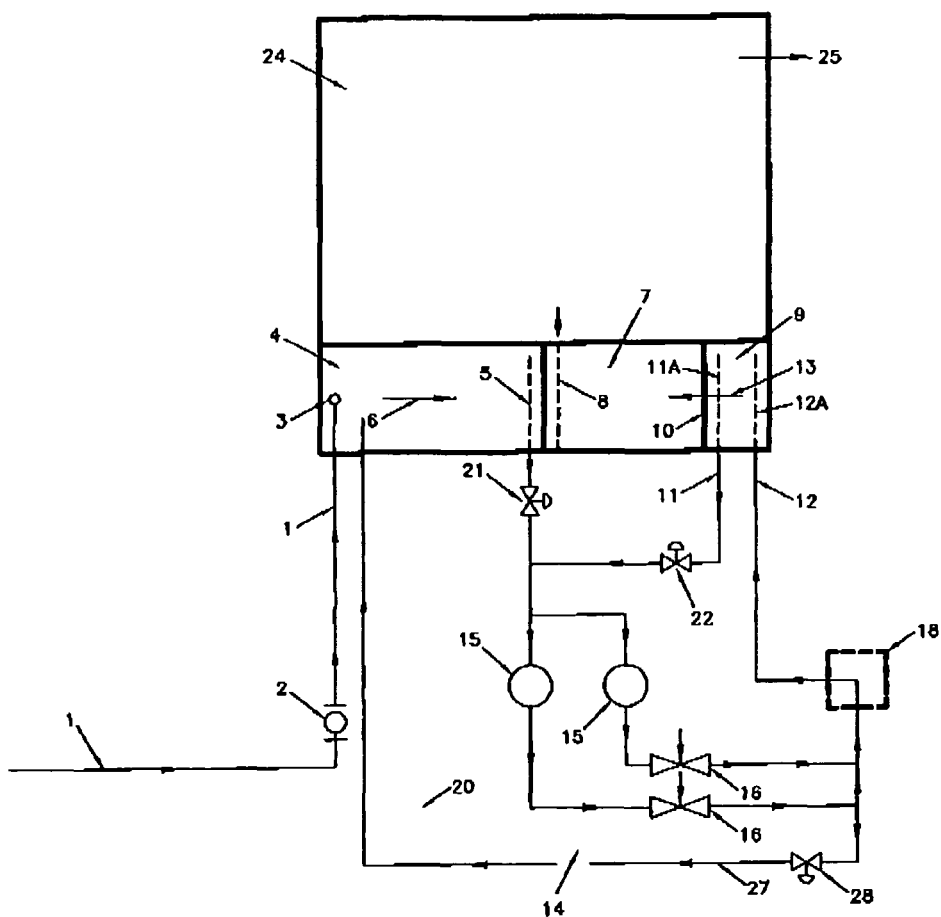
FIG. 1A is a schematic of a plan of a system similar to that shown in FIG. 1 but without the anoxic tank and with the aeration tank which is optional. This system is provided for a secondary treatment system.

Alternatively, as shown in FIG. 1A, the settled raw wastewater from the primary settling cell 4 and the returned activated sludge from the sludge return cell 9 can flow directly to the aeration pumps 15, air aspirator-mixers 16 and back to the sludge return cell 9 to accomplish a secondary treatment process for removal of suspended solids (SS) and biochemical oxygen demand (BOD).

The aeration tank 18 is preferred in cold climates, although, it may be eliminated in warm climates and the treatment process will be completed in the sludge return cell 9 which will function as an aeration and sludge return cell.

The automatic control valves 21 and 22 allow for optimization of the settled raw wastewater and the return activated sludge flow rates through the aeration system, proportioning of the ratio of the return activated sludge to the raw wastewater flow rates and operation of the aeration system within a specified wastewater levels in the primary settling cell 4 in order to use the primary settling cell 4 as a daily flow balancing cell.

The automatic control valve 19 allows for a control of the aerated wastewater recirculation from the aeration tank 18 to the anoxic tank 23.

Figure 2:
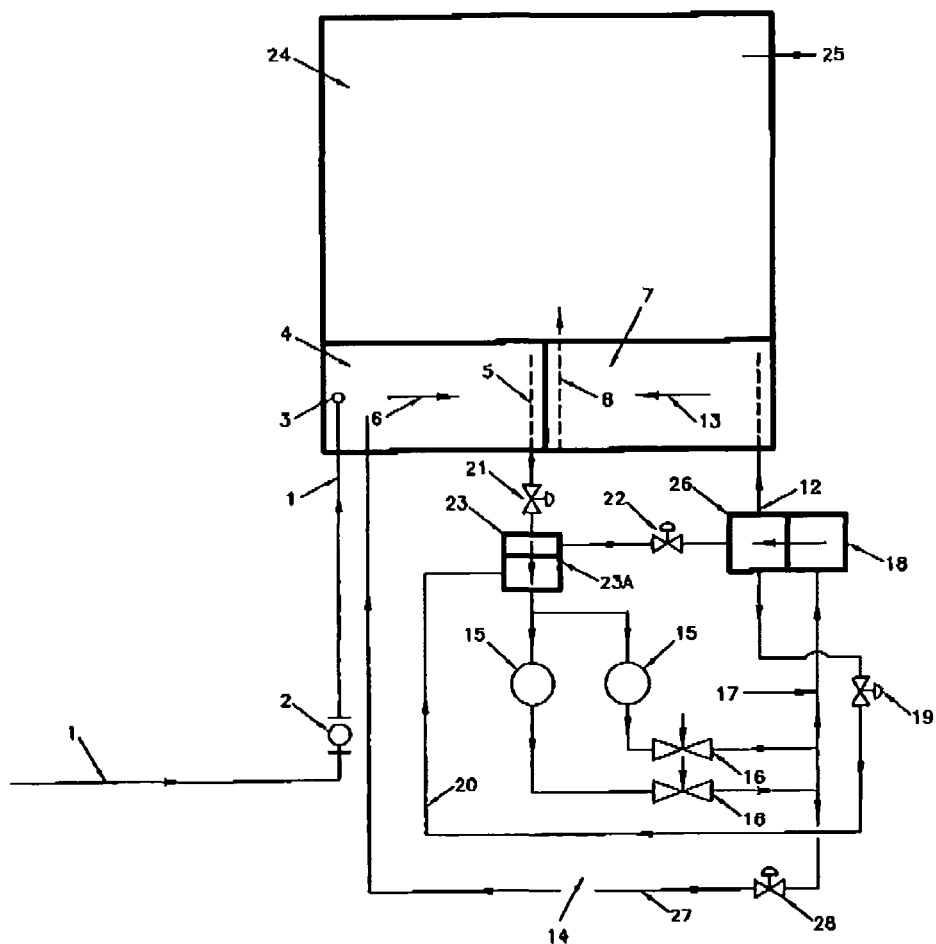
FIG. 2 is a schematic of a plan of a lagoon with an aeration system according to the second embodiment of the present invention showing a lagoon with a primary settling cell and a clarification cell and a storage cell which is optional, and an aeration system with two aeration pumps and two air aspirator-mixers, an aeration tank, a sludge return tank, and an anoxic tank which preferably comprises two compartments: upstream and downstream compartment. This treatment system is provided for a tertiary treatment system.

A second embodiment of the invention is shown on FIG. 2.

For the various embodiments disclosed here, the same reference numerals are used for the same or substantially similar features. Hence, the raw wastewater inlet pipe 1, the primary settling cell 4, the control valve 21, and the anoxic tanks 23 are in essence the same as those shown and described in FIG. 1. The clarification (secondary settling) cell 7 and the aeration system 14 are similar to those shown and described in FIG. 1.

The aeration treatment system, according to this embodiment, primarily comprises the raw wastewater inlet pipe 1, the primary settling cell 4, the clarification (secondary settling) cell 7, the anoxic tanks 23 and the aeration system 14.

The aeration treatment system may also include a new or existing treated wastewater primary storage cell 24.

The aeration system 14, comprises the aeration pumps 15, the air aspirator-mixers 16, the aeration tank 18, an activated sludge return tank 26, the recirculation by-pass pipe 20, the control valve 19, and the sludge return valve 22.

The aeration tank 18 is provided for a continuing aeration of the wastewater in addition to the aeration which takes place in the air aspirator-mixers 16.

The activated sludge return tank 26 allows for a partial clarification of the aerated wastewater, settling of some activated sludge to the bottom of the sludge return tank 26 and return of the settled activated sludge to the anoxic tank 23 and mixing of the sludge with the settled raw wastewater from the primary settling cell 4 in the anoxic tank 23.

The overflow from the sludge return tank 26 which is a partially clarified (settled) aerated wastewater flows partially to the clarification cell 7 and to the anoxic tank 23A where it mixes with the settled raw wastewater from the primary settling tank 4 and the return sludge from the sludge return tank 26.

The return sludge and the raw and aerated wastewater mixture flows from the anoxic tank 23 to the aeration pumps 15 and the air aspirator-mixers 16 and back to the aeration tank 18 to complete the aeration process.

The partially clarified treated wastewater undergoes further clarification in the clarification cell 7 before it flows to the outlet pipe 8 and into the storage cell 24 or directly to the environment for the final disposal. The control valves 19, 21 and 22 purpose and function are the same as those shown in FIG. 1.

The aeration treatment system as described above is a tertiary treatment process for removal of Biochemical Oxygen Demand (BOD), Suspended Solids (SS), and the nutrients: Phosphorus and Nitrogen.

Figure 2A:
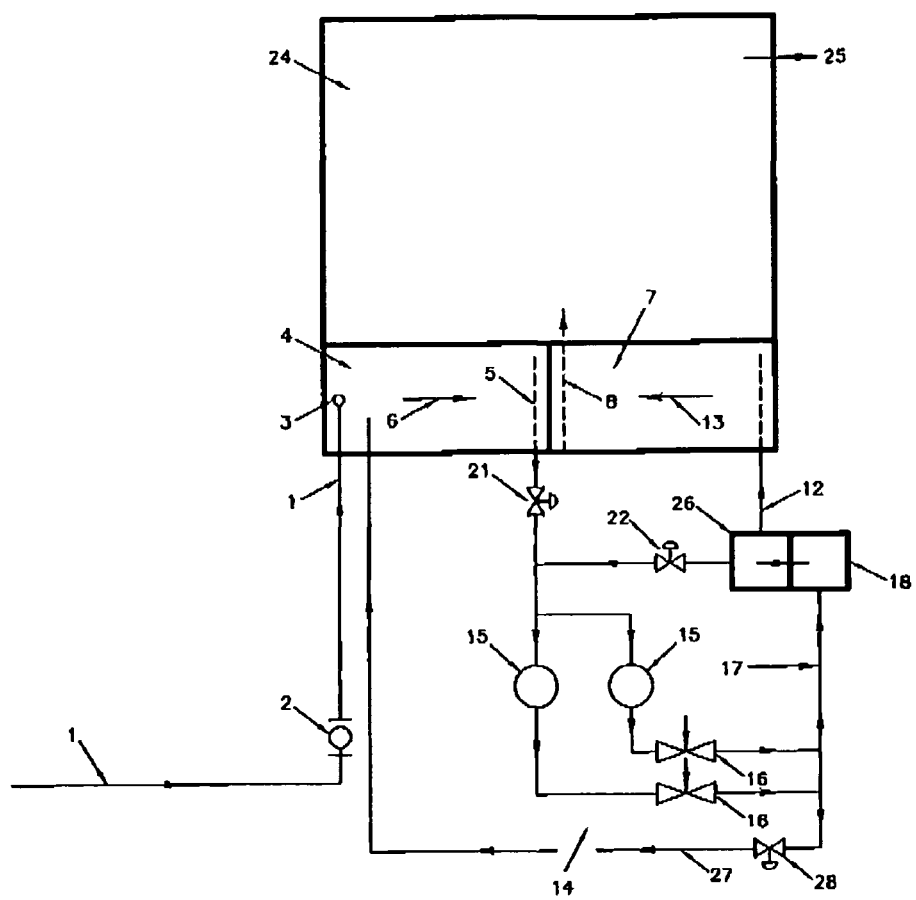
FIG. 2A is a schematic of a plan of a system similar to that shown in FIG. 2 but without the anoxic tank. This system is provided for a secondary treatment system.

Alternatively, as shown in FIG. 2A, the anoxic tank 23, and the aerated wastewater recirculation pipe 20, and the control valve 19 can be eliminated and the treatment process will function as a secondary activated sludge process for removal of BOD and suspended solids.

Figure 3:
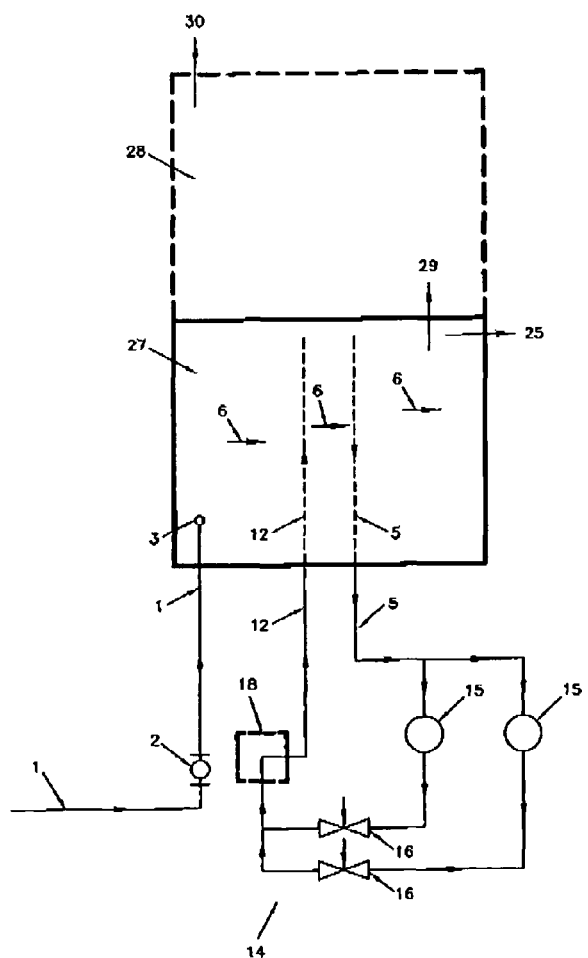
FIG. 3 is a schematic of a plan of a lagoon with an aeration system according to the third embodiment of the present invention showing a single cell lagoon and an aeration system with two aeration pumps and two air aspirator-mixers and an aeration tank, which is optional. This treatment system is provided for an extended aeration treatment system.
Figure 3A:
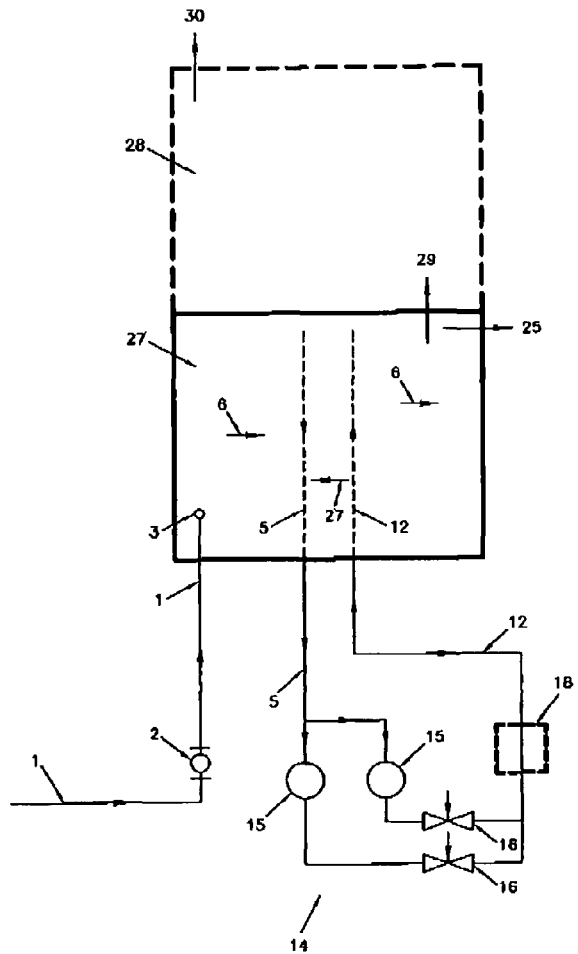
FIG. 3A shows a version of the system shown on FIG. 3 with a reversed wastewater flow direction from the lagoon to the aeration system and from the aeration system to the lagoon. This treatment system is provided for an extended aeration treatment system.

A third embodiment of the invention is shown on FIG. 3 and FIG. 3A.

For the various embodiments disclosed here, the same reference numerals are used for the same or substantially similar features. Hence, the raw wastewater inlet pipe 1 is in essence the same as that shown in FIG. 1 and FIG. 2 and the aeration system 14 is similar to that shown on FIG. 1 and FIG. 2. Also, the wastewater inlet and outlet pipes 5 & 12 located in the lagoon are similar to those shown on FIG. 1 & FIG. 2.

The treatment system, according to this embodiment, primarily consists of the raw wastewater inlet pipe 1, a settling and aeration cell 27, and the aeration system 14.

The treatment system is provided for an extended aeration treatment process.

The treatment system may also include a storage cell 28.

The settling and aeration cell 27 is provided for settling of the primary suspended solids and the bio-mass suspended solids (bacteria) produced during the treatment process and for aeration and recirculation of the wastewater to the aeration system 14.

The settling and aeration cell 27 is provided with the raw wastewater inlet 3, an aerated wastewater return pipe 12 and an aerated wastewater outlet pipe 5 which returns the wastewater to the aeration system 14. The wastewater flows in a direction 6 that is from the inlet 3 to an outlet 29 or 25.

The aerated wastewater return pipe 12 and the aerated wastewater outlet pipe 5 are preferably perforated multiple pipes, extended throughout the settling and aeration cell 27, and spaced such to provide preferably between one and two hours or longer wastewater retention time between the pipes. The pipes perforation or inlet/outlet nozzles are spaced evenly and frequently throughout the pipes' length to provide a plug wastewater flow pattern between the pipes. The pipes are preferably located closer to the centre of the lagoon in order to allow for adequate settling of the primary suspended solids contained in the raw wastewater before the wastewater is drawn through the wastewater outlet pipe 5 into the aeration system 14 and to allow for adequate settling of the bio-mass suspended solids before the treated wastewater is discharged through an outlet 29 or 25.

The arrangement of the aerated wastewater return pipe 5 and the aerated wastewater outlet pipe 12 can be reversed as shown on FIG. 3 and FIG. 3A.

The aeration system 14 consists of the aeration pumps 15, air aspirator-mixers 16, associated inlet and discharge piping and an optional aeration tank 18. The aeration tank 18 is preferred in cold climates where the wastewater freezing is expected.

The wastewater flow rate through the aeration system 14 is usually several times the raw wastewater inlet design flow rate and it depends on the raw wastewater quality and the treated wastewater effluent quality required.

The settling and aeration cell 27 capacity is usually from several days to several weeks of the raw wastewater peak day flow volume,

The invention claimed is:

1. A Wastewater Lagoon Aeration Treatment System comprising:
    a primary settling cell,
    an anoxic tank,
    an aeration system,
    a sludge return cell,
    a clarification (secondary settling) cell,
    control valves;
    said primary settling cell of an existing or a new lagoon comprises a raw wastewater pipe inlet, single or multiple and an outlet pipe located on the opposite side of said raw wastewater pipe inlet in said primary settling cell, and said outlet pipe is fluidly connected to said anoxic tank;
    said anoxic tank comprises two compartments; raw wastewater and activated sludge mixing compartment (upstream compartment) and return aerated wastewater and the raw wastewater and activated sludge mixture mixing compartment (downstream compartment);
    said aeration system is provided for aeration of wastewater outside a lagoon and it comprises an aeration pump, an air aspirator-mixer and an aeration tank, and which are fluidly connected, and said aeration system is fluidly connected to said anoxic tank and to said sludge return cell;
    said sludge return cell comprises an inlet pipe and an outlet pipe and is provided for settling of a portion of activated sludge and for return of the activated sludge and aerated wastewater to said aeration system located outside a lagoon comprising said sludge return cell, said clarification cell and said primary settling cell;
    said clarification cell is provided for final clarification of partially settled, aerated and treated wastewater which flows from said sludge return cell and for discharging of the clarified wastewater to a storage cell or directly to the environment through an outlet pipe;
    said control valves comprise a first control valve located on the outlet pipe of said primary settling cell upstream of said anoxic tank upstream compartment, a second control valve located on the outlet pipe of said sludge return cell upstream of said anoxic tank upstream compartment, and a third control valve located on a pipe which fluidly connects said aeration tank with said anoxic tank downstream compartment, wherein said first, second and third control valves are provided for optimization of settled raw wastewater and return activated sludge flow rates through said aeration system, proportioning of the ratio of the return activated sludge to the raw wastewater flow rates and operation of said aeration system within specified wastewater levels in said primary settling cell in order to use said primary settling cell as a daily flow or longer balancing cell, and for control of aerated wastewater recirculation from said aeration tank to said anoxic tank downstream compartment.

2. A Wastewater Lagoon Aeration Treatment System as per claim 1 wherein said primary settling cell is provided for settling and anaerobic decomposition of primary suspended solids (primary sludge) and for equalization of the raw wastewater flow rates throughout a day or several days, and said primary settling cell retention capacity can be from several days to several weeks of an average day raw wastewater flow volume.

3. A Wastewater Lagoon Aeration Treatment System as per claim 2 wherein said primary settling cell outlet pipe is located in said primary settling cell on the opposite side from said raw wastewater inlet and said outlet pipe preferably extends throughout the entire adjacent side of said cell, and said outlet pipe is perforated or has multiple inlet nozzles to promote a plug flow through said primary settling cell, and said outlet pipe is fluidly connected with said anoxic tank upstream compartment through said first control valve.

4. A Wastewater Lagoon Aeration Treatment System as per claim 3 wherein said anoxic tank comprises two compartments; an upstream compartment and a downstream compartment and said compartments are fluidly connected, and said upstream compartment receives settled raw wastewater from said primary settling cell through said primary settling cell outlet pipe and said first control valve and return activated sludge from said sludge return cell through said sludge return cell outlet pipe and said second control valve, and said downstream compartment receives raw wastewater and activated sludge mixture from said upstream compartment and a portion of aerated wastewater from said aeration tank through a return pipe and said third control valve, and the activated sludge recirculation from said sludge return cell and the aerated wastewater recirculation from said aeration tank to said anoxic tank upstream and downstream compartments respectively is done to promote phosphorus removal and denitrification.

5. A Wastewater Lagoon Aeration Treatment System as per claim 4 wherein said anoxic tank may receive a recirculation of a portion of aerated wastewater and activated sludge, to promote phosphorus removal and denitrification, and said recirculation of activated sludge is from said sludge return cell to said anoxic tank upstream compartment and said recirculation of aerated wastewater is from said aeration tank to said anoxic tank downstream compartment.

6. A Wastewater Lagoon Aeration Treatment System as per claim 4 wherein said aeration tank is provided for an additional aeration of wastewater, in addition to the aeration of the wastewater provided in said air aspirator-mixer, for a period of one to several hours, for an adequate aeration of the wastewater, and the aerated wastewater is partially returned to said sludge return cell and to said anoxic tank downstream compartment, and said aeration tank is preferred in cold climates, and it can be eliminated in warm climates, and in such case, the aeration process is completed in said sludge return cell which will function as an aeration and sludge return cell.

7. A Wastewater Lagoon Aeration Treatment System as per claim 6 wherein said sludge return cell may be partitioned from said clarification cell with a low height partition wall made of concrete, wood, plastic, earth or other material and said sludge return cell holding capacity can be from one to several hours or longer of the average day raw wastewater flow rate, to retain a portion of activated sludge for recirculation to said aeration system, through said second control valve, at a flow rate of between ten to hundred percent or larger of the raw wastewater flow rate, and said sludge return cell will function as an aeration cell and a sludge return cell if said aeration tank is eliminated, preferably in warm climates.

8. A Wastewater Lagoon Aeration Treatment System as per claim 7 wherein said clarification cell receives partially settled and treated wastewater from said sludge return cell and said clarification cell allows for final clarification of treated wastewater and anaerobic decomposition of secondary sludge which is predominantly the bio-mass developed in the biological treatment process which takes place in the treatment system, and said clarification cell retention capacity can be from several days to several weeks of the average day flow volume of the wastewater.

9. A Wastewater Lagoon Aeration Treatment System of claim 8 wherein said clarification cell is provided with said outlet pipe which is perforated or has multiple inlet nozzles along the entire adjacent wall of said clarification cell to promote a plug flow through said sludge return cell and said clarification cell, and said outlet pipe discharges clarified treated wastewater to a storage cell or directly to the environment.

10. A Wastewater Lagoon Aeration Treatment System of claim 1 wherein said primary settling cell, said anoxic tank, said aeration system, said sludge return cell and said clarification cell are provided for a tertiary treatment system, and wherein said primary settling cell, said aeration system, said aeration tank, said sludge return cell and said clarification cell are provided for a secondary treatment system; although, said aeration tank is optional in said secondary treatment system.

11. The Wastewater Lagoon Aeration Treatment System as per claim 1 is provided for treatment of municipal and industrial wastewater in existing or new lagoons or stabilization ponds and which can be operated as an activated sludge process in a secondary or tertiary wastewater treatment system.

12. A Wastewater Lagoon Aeration Treatment System as per claim 1 wherein said raw water inlet pipe, single or multiple, is provided with a flow meter and single or multiple inlet into said primary settling cell.

13. A Wastewater Lagoon Aeration System as per claim 1 wherein said aeration system is provided for wastewater aeration outside a lagoon and which comprises primarily said aeration pump, said air aspirator-mixer, said aeration tank and said anoxic tank, and wherein said aeration tank and said anoxic tank can be used as options, depending on the level of treatment required, and which can be a secondary or tertiary treatment system.

14. A Wastewater Lagoon Aeration Treatment System as per claim 13 wherein said aeration system comprises said aeration pump which can be single or multiple pump system, preferably effluent, high efficiency centrifugal wastewater pump with capacity of several times the average daily flow rate for a peak day wastewater flow volume, for adequate activated sludge and aerated wastewater recirculation to said aeration system.

15. A Wastewater Lagoon Aeration Treatment System as per claim 13 wherein said aeration system comprises said air aspirator-mixer which aspires and mixes air and wastewater to Introduce sufficient oxygen level into the wastewater for an aerobic biological wastewater treatment process, and said air aspirator-mixer is fluidly connected with said aeration pump and said aeration tank and is located downstream of said aeration pump and upstream of said aeration tank.

16. A Wastewater Lagoon Aeration Treatment System comprising:
   a primary settling cell,
   an anoxic tank,
   an aeration system,
   a clarification (secondary settling) cell,
   control valves;
   said primary settling cell of an existing or a new lagoon comprises a raw wastewater pipe inlet, single or multiple and an outlet pipe located on the opposite side of said raw wastewater pipe inlet in said primary settling cell, and said outlet pipe is fluidly connected to said anoxic tank;
   said anoxic tank comprises two compartments; raw wastewater and activated sludge mixing compartment (upstream compartment) and return aerated wastewater and the raw wastewater and activated sludge mixture mixing compartment (downstream compartment);
   said aeration system is provided for aeration of wastewater outside a lagoon and it comprises an aeration pump, an air aspirator-mixer, an aeration tank, an activated sludge return tank, a recirculation by-pass pipe, and which are fluidly connected, and said aeration system is fluidly connected to said anoxic tank upstream and downstream compartments and to said clarification cell;
   said clarification cell is provided for final clarification of partially settled, aerated and treated wastewater which flows from said activated sludge return tank and for discharging of the clarified wastewater to a storage cell or directly to the environment through an outlet pipe;
   said control valves comprise a first control valve located on the outlet pipe of said primary settling cell upstream of said anoxic tank upstream compartment, a second control valve located on a pipe which connects said sludge return cell to said anoxic tank upstream compartment, and a third control valve located on said recirculation by-pass pipe which connects said sludge return tank with said anoxic tank downstream compartment, wherein said first, second and third control valves are provided for optimization of settled raw wastewater and return activated sludge flow rates through said aeration system, proportioning of the ratio of the return activated sludge to the raw wastewater flow rates and operation of said aeration system within specified wastewater levels in said primary settling cell in order to use said primary settling cell as a daily flow or longer balancing cell, and for control of aerated wastewater recirculation from said activated sludge return tank to said anoxic tank downstream compartment.

17. A Wastewater Lagoon Aeration Treatment System of claim 16 wherein said activated sludge return tank allows for a partial clarification of aerated wastewater, settling of some activated sludge to the bottom of said tank and return of the settled activated sludge to said anoxic tank upstream compartment through said second control valve, and mixing of said return activated sludge with settled raw wastewater in said anoxic tank upstream compartment.

18. A Wastewater Lagoon Aeration Treatment System of claim 17 wherein said activated sludge return tank overflows with partially clarified (settled) aerated wastewater to said clarification cell and to said anoxic tank downstream compartment through said third control valve and said recirculation by-pass pipe, where said partially clarified aerated wastewater mixes with said settled raw wastewater and said return activated sludge.

19. A Wastewater Lagoon Aeration Treatment System comprising:
a settling and aeration cell,
an aeration system;
said settling and aeration cell is provided with a raw wastewater inlet pipe, an aerated wastewater return pipe and an aerated wastewater outlet pipe which returns the wastewater to said aeration system, and a treated wastewater outlet;
said aeration system comprises an aeration pump, an air aspirator-mixer, associated inlet and discharge piping and an aeration tank which is optional, but which is preferred in cold climates.

20. A Wastewater Lagoon Aeration Treatment System comprising:
a settling and aeration cell,
an aeration system:
wherein said settling and aeration cell is provided for settling of primary suspended solids (primary sludge) and bio-mass suspended solids (secondary sludge) produced during the treatment process, and for aeration and recirculation of wastewater to said aeration system, to provide an extended aeration treatment process in which the wastewater flows from a raw wastewater inlet to said treated wastewater outlet of said settling and aeration cell.

21. A Wastewater Lagoon Aeration Treatment System comprising:
a settling and aeration cell,
an aeration system:
wherein said settling and aeration cell contains and aerated wastewater return pipe and an aerated wastewater outlet pipe and said aerated wastewater return pipe and said aerated wastewater outlet pipe are preferably perforated pipes and extended throughout said settling and aeration cell, and said pipes are spaced such to provide preferably between one and two hours or longer wastewater retention time between said pipes, and said pipes perforation or inlet/outlet nozzles are spaced evenly and frequently throughout said pipes' length to provide a plug wastewater flow pattern between the pipes, and said pipes are preferably located closer to the centre of said cell in order to allow for adequate settling of said primary suspended solids contained in the raw wastewater before the wastewater is drawn through said wastewater outlet pipe into said aeration system, and to allow for adequate settling of said bio-mass suspended solids before the treated wastewater is discharged through a treated wastewater outlet.

22. A Wastewater Lagoon Aeration Treatment System comprising:
a settling and aeration cell,
an aeration system;
wherein wastewater flow rate from said aeration system is usually several times the raw wastewater inlet design flow rate and which depends on the raw wastewater quality and the treated wastewater effluent quality required, and wherein said settling and aeration cell capacity is usually from several days to several weeks of the raw wastewater peak day flow volume, and said aeration system and said settling and aeration cell are provided for an extended aeration treatment process.

* * * * *